United States Patent
Shore et al.

(10) Patent No.: US 11,429,668 B2
(45) Date of Patent: *Aug. 30, 2022

(54) METHODS AND SYSTEMS FOR MULTIDIMENSIONAL ANALYSIS OF INTERCONNECTED DATA SETS STORED IN A GRAPH DATABASE

(71) Applicant: Workday, Inc., Pleasanton, CA (US)

(72) Inventors: Matthew Shore, Belmont, CA (US); Huned Botee, San Francisco, CA (US); Joe Kuo, Redwood City, CA (US); Suresh Balasubramhanya, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,846

(22) Filed: Dec. 15, 2020

(65) Prior Publication Data

US 2021/0173870 A1    Jun. 10, 2021

Related U.S. Application Data

(63) Continuation of application No. 15/062,110, filed on Mar. 5, 2016, now Pat. No. 10,909,178.

(Continued)

(51) Int. Cl.
 *G06F 16/90* (2019.01)
 *G06F 16/28* (2019.01)
 *G06F 16/901* (2019.01)

(52) U.S. Cl.
 CPC ........ *G06F 16/9024* (2019.01); *G06F 16/283* (2019.01)

(58) Field of Classification Search
 CPC .................... G06F 16/9024; G06F 16/283
 See application file for complete search history.

(56) References Cited

U.S. PATENT DOCUMENTS

| 6,581,068 B1 * | 6/2003 | Bensoussan ...... G06F 16/24539 707/999.102 |
| 8,069,146 B2 | 11/2011 | Gupta |

(Continued)

OTHER PUBLICATIONS

Wilkinson K, Simitsis A. Designing integration flows using hypercubes. InProceedings of the 14th International Conference on Extending Database Technology Mar. 21, 2011 (pp. 503-508). (Year: 2011).*

(Continued)

*Primary Examiner* — Mohsen Almani
(74) *Attorney, Agent, or Firm* — Van Pelt, Yi & James LLP (57) ABSTRACT

Multidimensional databases are well-suited for viewing data at different levels of detail. Graph databases are well-suited for modeling data sets with complex relationships. A novel platform for analysis and planning is enabled by linking multidimensional and graph databases. Graphs are data structures stored in graph databases. Graphs use nodes and edges to model data elements, some of which are derived. A graph is traversed to derive new data elements. To perform analysis on the graph data elements, graph traversal paths are stored as tuples in a fact table. This fact table is in turn loaded into the multidimensional database by mapping the fact table's attribute columns to dimensions of the multidimensional database.

10 Claims, 4 Drawing Sheets

Related U.S. Application Data (60) Provisional application No. 62/128,805, filed on Mar. 5, 2015.

(56) References Cited

U.S. PATENT DOCUMENTS

| | | | | |
|---|---|---|---|---|
| 8,849,747 | B2* | 9/2014 | Balko | G06Q 10/067 707/602 |
| 2006/0218157 | A1 | 9/2006 | Sourov | |
| 2008/0281801 | A1 | 11/2008 | Larson | |
| 2011/0258167 | A1* | 10/2011 | Binstock | G06Q 40/02 707/804 |
| 2012/0179644 | A1* | 7/2012 | Miranker | G06F 16/211 707/605 |
| 2015/0186825 | A1 | 7/2015 | Balasubramhanya | |
| 2016/0063081 | A1 | 3/2016 | Rudolf | |
| 2017/0116228 | A1 | 4/2017 | Alberg | |
| 2017/0140310 | A1 | 5/2017 | Gottemukkala | |

OTHER PUBLICATIONS

Ghrab et al. "An analytics-aware conceptual model for evolving graphs." International Conference on Data Warehousing and Knowledge Discovery. Springer, Berlin, Heidelberg, 2013.

Chen et al. "Graph OLAP: a multi-dimensional framework for graph data analysis." Knowledge and Information Systems 21.1 (2009): 41-63. (Year: 2009).

Jakawat et al. "OLAP Cube-based Graph Approach for Bibliographic Data." Received: Dec. 29, 2008 / Revised: Apr. 5, 2009 / Accepted: May 9, 2009 © The Author(s) 2009. This article is published with open access at Springerlink.com (Year: 2008).

Lakshmanan et al. "What-if OLAP queries with changing dimensions." Data Engineering, 2008. ICDE 2008. IEEE 24th International Conference on. IEEE, 2008.

Laurent A. Castelltort A. NoSQL Graph-based OLAP Analysis. InKDIR Oct. 21, 2014 (pp. 217-224). (Year: 2014).

* cited by examiner

| Customer | Sales Rep | Product | Measure | Period | Value |
|---|---|---|---|---|---|
| Customer 1 | Sales Rep 1 | Product 1 | Projected Revenue | Week1 | 10,000 |
| Customer 2 | Sales Rep 2 | Product 1 | Projected Revenue | Week1 | 20,000 |

METHODS AND SYSTEMS FOR MULTIDIMENSIONAL ANALYSIS OF INTERCONNECTED DATA SETS STORED IN A GRAPH DATABASE

CROSS REFERENCES TO RELATED APPLICATIONS

This application is a continuation of U.S. patent application Ser. No. 15/062,110, entitled METHODS AND SYSTEMS FOR MULTIDIMENSIONAL ANALYSIS OF INTERCONNECTED DATA SETS STORED IN A GRAPH DATABASE filed Mar. 5, 2016, which claims priority to U.S. Provisional Patent Application No. 62/128,805, entitled METHODS AND APPARATUS FOR MULTIDIMENSIONAL ANALYSIS OF INTERCONNECTED DATA SETS STORED IN A GRAPH DATABASE filed Mar. 5, 2015, each of which is incorporated herein by reference for all purposes.

FIELD

This application relates to the field of enterprise software applications, i.e., computer-software based tools used to satisfy the needs of organizations and businesses rather than individual users. In particular but not exclusively, the application relates to data management and analysis and techniques for analyzing large complex data sets.

BACKGROUND

Companies and organizations often have planners, analysts, and managers who develop periodic business and function-specific plans such as financial plans and sales plans. The typical flow in preparing such a plan consists of the following steps:
1. Assemble lists of master data members. For instance, it one were preparing a sales plan, these lists would include a list of sellable products, a list of current and prospective customers, and a list of sales regions.
2. Create relationships to organize the above master data members. This could include organizing products into a product hierarchy, customers into a customer hierarchy, and so on.
3. Prepare computational logic to develop the plan. This would, for instance, be to express a the following formula:

Projected Sales Volume=Average Historical Sales Volume×Estimated Growth Rate.

4. Load data. For instance, it could be historical sales data by product, customer, region, and month.
5. Develop alternate scenarios for planning. This could be, for instance, where different estimates of sales growth rates are put in different scenarios to facilitate side-by-side comparisons.
6. Prepare reports and recommendations for management based on analysis of scenarios.

Often, Microsoft Excel is used as a starting point to develop such plans, given its flexibility and ubiquity. However, Excel has limitations in terms of sealing to large datasets and collaboration with other team embers.

The next commonly used set of tools is based on OLAP (On-Line Analytical Processing) technology. OLAP tools organize data in multiple dimensions to allow ad hoc analysis where-in a user could conduct a directed search which traverses various dimensions in the data before ultimately zeroing in on the detailed data of interest.

OLAP systems view data as residing at the intersection of members from dimensions. That is, the data underlying OLAP systems are organized and stored as a multidimensional database (or a modified relational database) which is an instantiation of the cross-product of all of the dimensions. This allows the user to traverse hierarchies of detail along dimensions of interest in an ad hoc manner to get at specific data.

Traditional OLAP tools are good in modeling large and complex business problems but have some key issues that are described below.

One issue is around adding, modifying or deleting master data elements—for example, adding or discontinuing a product or reorganizing where a product fits in a product hierarchy—wherein the system has to invalidate and recompute large parts of the multi-dimensional data model. This limitation makes the tool restrictive in supporting cases where master data elements do change significantly over time.

Another issue is around the inherent cross-product nature of the tool, which often leads to an explosion of the number of potential combinations and consequently leads to scalability issues. Attempts at addressing this limitation include introducing concepts of a "data block" wherein sets of data are stored as a vector as opposed to storing data at individual cells. Modeling with data blocks in turn needs introduction of other new modeling concepts such as sparse and dense dimensions. These modeling restrictions are often surfaced to end users and lead to reduced usability of the tool for modeling purposes.

The cross-product nature of OLAP models also leads to invalid combinations of data. For instance, if a brand of products is sold only in one region and not in others, this relation becomes hard to express in an OLAP tool due to the inherent cross-product nature of the system. Another instance of modeling inadequacy is in the case of describing a product bill-of-materials ("BOMs"), which expresses how a product should be built. BOMs have concepts of "quantity-per-assembly", which are scale factors that are properties of edges and not of the members themselves, and this is not possible to express in a traditional OLAP tool.

Separately, in computing, a graph database is a database that uses graph structures for semantic queries with nodes, edges, and properties to represent and store data. Typical graph database use cases include social networking, insurance risk analysis, and gene sequencing.

Separately, Material Requirements Planning (MRP) is a computer-based inventory management system designed to assist production managers in scheduling and placing orders for items of dependent demand. Dependent demand items are components of finished goods such as raw materials, component parts, and subassemblies for which the amount of inventory needed depends on the level of production of the final product.

MRP systems use a process known as "pegging" for tracking the sources of a component item's gross inventory requirements. For example, if two mobile phone finished goods, FG1 and FG2, use the same memory chip, M. And further FG1 uses 1 item of the memory chip while FG2 uses 2 items of the memory chip and that projected demand for FG1 and FG2 is 1,800 and 1,200 units, respectively. Then the MRP system would calculate gross demand on memory chip M as demand from FG1 plus demand from FG2, or Gross Demand($M$)=1,800×1+1,200×2=4,200

The MRP system would use the pegging process to create two additional records to track demand "pegged" to FG1 and FG2. Specifically, Pegged Demand(M,FG1)=1,800

Pegged Demand(M,FG2)=2,400

A peg prevents the incoming supply from being reserved for another demand transaction. The method for developing a pegging plan consists of preparing tuples of linked demand sources and supply sources. In addition, the list of pegged component demand records can be prioritized based on different types of demand (e.g., firm demand vs. forecast) and types of supply (e.g., committed supply vs. planned supply).

Separately, in data warehousing, a Fact Table consists of the measurements, metrics or facts of a business process. It is located at the center of a star schema or a snowflake schema surrounded by dimension tables. A Fact Table typically has two types of columns: those that contain facts and those that are a foreign key to dimension tables. The primary key of a fact table is usually a composite key that is made up of all of its foreign keys. Fact Tables store the detail records of a data warehouse as different types of measures, such as additive, non-additive, and semi additive measures.

BRIEF SUMMARY OF CERTAIN EMBODIMENTS

In one aspect, the methods, systems, and devices disclosed herein, including computer program products, provide a flexible data management and analysis solution. The disclosed methods, systems, and devices accomplish that by combining OLAP and Data Warehouse technology with graph databases and a generalized pegging process. The disclosed methods, systems, and devices also provide for scenario management capabilities for what-if analysis on top of the data management solution.

While OLAP technologies are great for presenting data at different levels of detail, they suffer from performance degradation as the dimensionality and size of data set increase and from modeling limitations due to structural stability requirements of the cubes. On the other hand graph databases are inherently more scalable and support less restrictive data models than OLAP systems. However, they are not as well suited for data presentation as their cubular counterparts.

The hybrid graph-cube system disclosed herein combines the benefits of both OLAP and graph databases and the shortcomings of neither. Simply combining OLAP and graph databases would not have been possible before the disclosure of the methods, systems, and devices disclosed herein, particularly the novel application of MRP Pegging and Data Warehousing to the combination of OLAP and graph databases. Specifically, (1) the measures in graph nodes are modified to track values pegged to measures in upstream nodes, rather than just totals, and (2) the peg records are mapped to a Fact Table, which can be virtual or physical and serves as the communication conduit between the graph and cube.

DETAILED DESCRIPTION OF CERTAIN EMBODIMENTS

Figure 1:
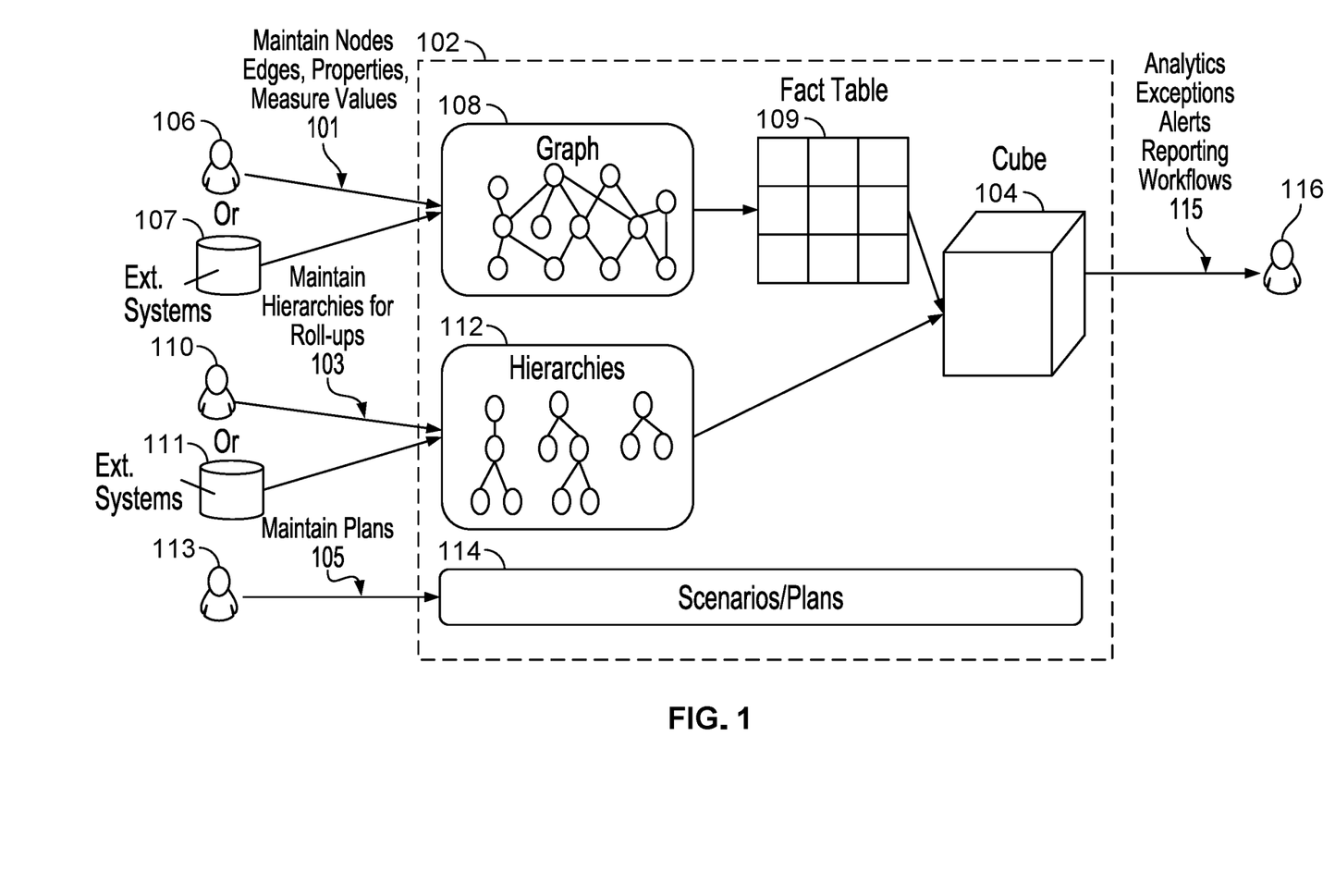
FIG. 1 illustrates a diagram of an example environment, which may be used to implement the system described herein.

In general, in one aspect, the present disclosure provides methods, systems, and devices, including computer program products, for a flexible data management and analysis solution. The disclosed methods, systems, and devices are generally described by reference to six major areas:
1. Preparing the graph database
2. Setting up the base plans
3. Traversing the graph database
4. Developing links from the graph database to the multi-dimensional model.
5. Refreshing the multi-dimensional model
6. Managing scenarios The building blocks of the methods, systems and devices disclosed herein are explained in FIG. 1. 101 represents the input of graph data into the system either by a user 106 and/or from more external sources of data 107. The inputs include the definition and values for nodes, edges, properties, and measure values. The input of graph data 101 results in the instantiation of a graph structure 108 and the systemic transformation 102 of the graph data into a logical fact table 109. 103 represents input of hierarchical and cube-specific measure data from a user 110 and/or from external sources of data 111, which may be the same as or different from user 106 or external data source 107. The input of hierarchical, cube-specific measure data 112 results in the instantiation of a multidimensional model, or cube, 104 that combines the fact table data and the hierarchical data. 105 represents the ability of a system user 113, which may be the same as or different from users 106 and/or 110, to analyze the system, e.g., by performing a what-if analysis, by running one or more user-specific scenarios/plans 114. A user 116, which may be the same as or different from users 106, 110, and/or 113, may then extract data from the hypercube in the form of analytics, exceptions, alerts, reporting, and workflows 115. The methods, systems, and devices disclosed herein significantly improve the computational efficiency of data analysis and, thus, reduce computational resource requirements.

In the above description, the systemic transformation of the graph data into a logical fact table involves translating paths into coordinates, which become primary keys of the fact table. The translation may include a subset of the nodes. For example, in the case of BOMs, one may be interested in a subset of the components, e.g., only the components purchased from an external supplier. A generic function, e.g., add_to_fact, can be specified to test whether a node should be included in the fact.

One exemplary algorithm to construct the logical fact table is as follows:
1. Impose a topological ordering on the graph
2. Traverse the graph starting with the first node
3. For each node visited, test whether node, n, should be included: if (add_to_fact(n)) then
   a. If node, n, is to be included, add it to the key column of logical fact table
   b. Apply all edge measure functions to the edge metrics between node n and all of its parent nodes c. Write the resulting values for each of the edge measures as fact columns of the logical fact table 1. Preparing the Graph Database A graph database is a container for graphs. Graphs are made up of nodes and edges, which describe relationships between nodes. Graphs can be traversed by starting at some node and arriving at another via connecting edges, possibly with other nodes in between. The methods, systems, and devices disclosed herein provide for developing business data models using graph concepts of nodes, edges, paths, properties, and measures.

Figure 2:
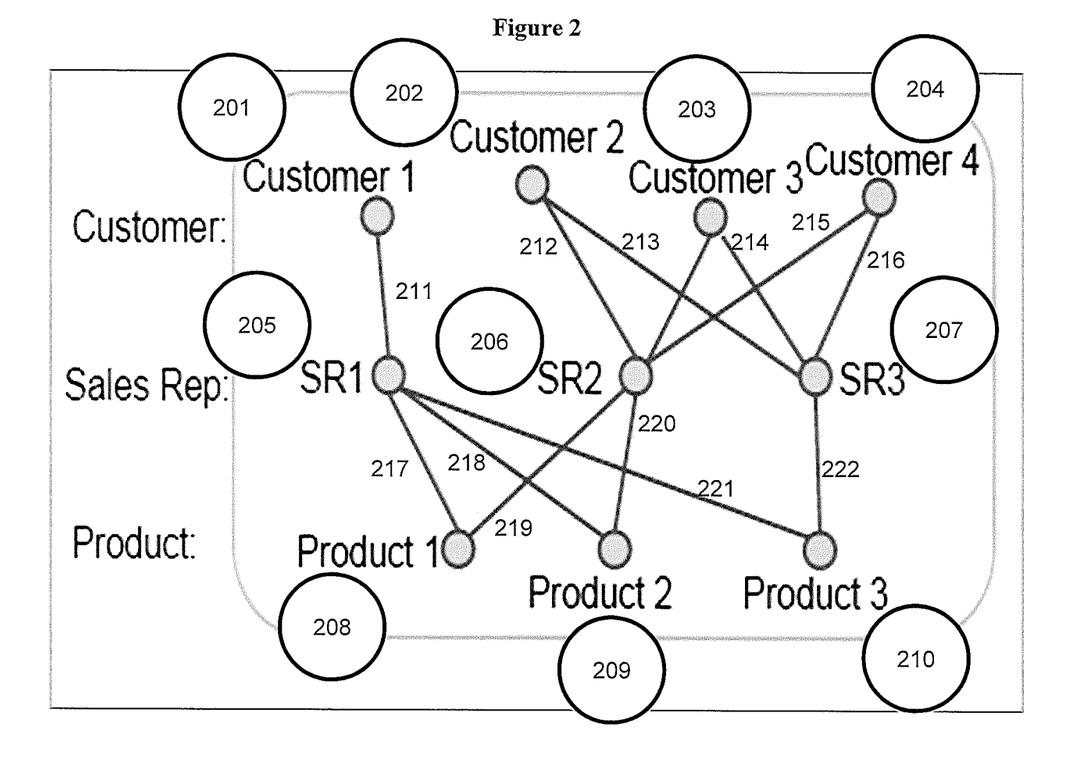
FIG. 2 illustrates an example sales territory plan rendered as a graph, according to some implementations.
Figure 3:
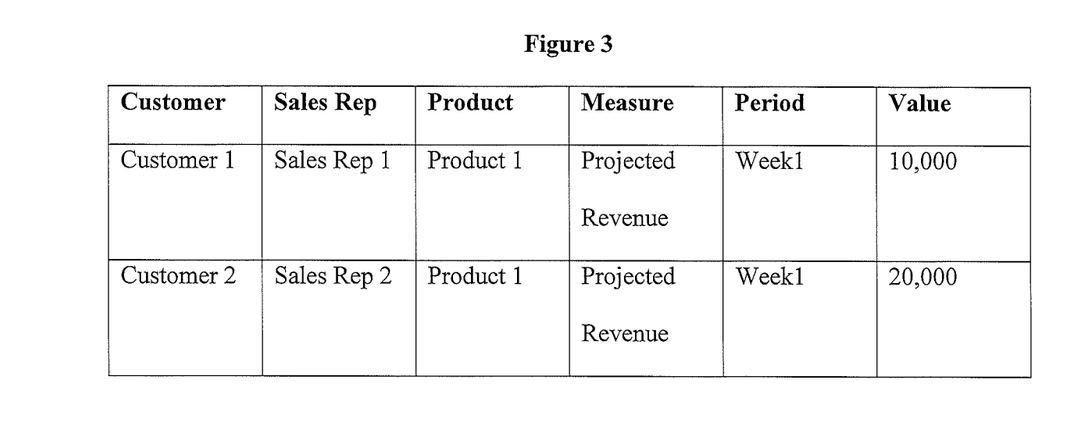
FIG. 3 illustrates an example of a logical fact table representing output of graph traversal, according to some implementations.

For example, FIG. 2 represents a graph structure describing relationships between nodes represented as customers 201, 202, 203, and 204; sales representatives 205, 206, and 207; and products 208, 209, and 210. A node is a modeling entity where properties and values can be expressed. To explain this further, let us use an example of a sales plan model. The model needs to capture the list of sales representatives, the customer accounts they are targeting, and the sets of products that they are selling. One output of the model might be the projected revenues across the organization. All products 208, 209, and 210, sales representatives 205, 206, and 207, and customer accounts 201, 202, 203, and 204 would be nodes in the above model. Each node can contain one or more properties, or labels, as well as one or more time varying values, known a measures. An example of a property would be the "type" of the node, and the types might be "sales rep", "product" or "customer." Measures at the nodes are values that express numbers of interest, such as "Selling Price per Unit" (for the product nodes) and "Sales Quota in Dollars" (for the sales representative nodes). Measures are typically also correlated with time.

Time-dependent graph node and edge properties can be values and characteristics of nodes and edges that change over time. For example, a node that represents parts of a bicycle may contain unit cost. If that part becomes less expensive due to a volume discount, the unit cost will decrease but only as of the moment that the volume discount goes into effect.

Time-dependent properties may be tracked by graph versioning. A graph version can be a timestamp the represents one or more changes to a graph. For example, when a graph is first instantiated, its version can be v=0. When a later change is introduced, e.g., a sales rep that used to roll-up to East moves to West, these changes are recorded as deltas compared against the graph with version v=0. When the new graph is instantiated, its version is advanced to v=1.

According to the methods, systems, and devices disclosed herein, relationships are provided between the nodes, which relationships are referred to as "edges," e.g., 211, 212, 213, 214, 215, 216, 217, 218, 219, 220, 221, and 222. Like nodes, edges can have properties and measures. For instance, a sales rep (e.g., Sales Rep 1 205) might have target revenue that he/she has to meet for a particular product (e.g., Product 1 208). In this case Target Revenue would be a measure at the edge between a sales rep and a product (e.g., edge 218).

The relationship between nodes does not need to be just between two nodes, and can be generalized to many interconnected nodes. For instance, Sales Rep 1 205 might forecast specific revenue from Customer 1 201 for Product 1 208. From a modeling perspective, this needs a measure called Forecast Revenue that lies at the combination of Sales Rep 1 205, Customer 1 201, and Product 1 208. This is called a path, and the methods, systems, and devices disclosed herein provide for defining measures and properties along a path, which according to the present example, would be defined as path 211-217.

By applying the methods, systems, and devices disclosed herein, the objects mentioned above can be efficiently tracked with effectivity dates, which are used to designate start and end dates of the data element. This enables all objects to have a life-cycle within the system. For instance, if a new product is planned to be introduced in six months, the user can add a node for the new product, with an effectivity start date six months from current date.

Furthermore, there is another timestamp associated with adding the node in the first place—i.e., a "revision date"—that the system tracks to determine the time when the data object was entered into the system. The methods, systems, and devices allow this revision date to be used track the state of the model over time. If a user wants to review the plan as of a particular point in time, the system can filter out all objects that were inserted or updates that were performed after the point in time, and thus present the state of the model exactly as it was in that point in time.

Another aspect of the methods, systems, and devices of this disclosure is to have the measures be either input measures (i.e., measures where users enter in values), loaded measures (i.e., measures loaded from external systems or tables), or derived measures (i.e., measures that are a function of other measures.) An input measure might be, for instance, the Projected Selling Price per Unit of a product which could be maintained by a user. An example of a loaded measure might be Historical Sales Revenue, which might be loaded into the solution from an external system such as an Enterprise Resource Planning (ERP) system or a data warehouse. An example of a derived measure would be Projected Revenue, which might be expressed as the Projected Selling Price per Unit times the Projected Sales Volume.

A derived measure at a particular location in the graph (i.e., at a particular node, edge, or path can be a function of other measures at the node or a function of measures at other nodes that are related to the current node in the graph. In the above example, Projected Selling Price per Unit might be defined at a specific product node (e.g., Product1). The formula for Projected Revenue at a path—e.g. Customer1.SalesRep1.Product1 211-217—might be:

Projected Revenue at
   Customer1.SalesRep1.Product1=Projected Sales
   Volume at Customer1.SalesRep1.Product1×Projected Sales Price per Unit at Product1

In the example above, the node Product1 208 would be considered upstream of the path Customer1.SalesRep1.Product1 211-217 because Projected Sales Price per Unit at Product1 208 would need to be evaluated prior to evaluating Projected Revenue at path Customer1.SalesRep1.Product1 211-217.

Broadly speaking, the data sets expressed through the building blocks of nodes, edges, paths, properties, and measures form the basis of a logical graph data structure. In addition, the measures provide a direction of flow of data. In other words, measures provide for an executable program comprised of instructions that must be evaluated in order. The program can specify a node ordering for graph traversal that is different than the one expressed by the edges connecting the nodes. In this case, the program itself can be represented by a Directed Acyclic Graph (DAG) data structure. In general, a DAG is a graph formed by a collection of nodes and directed edges, such that there is no way to start at some node, n, and follow a sequence of edges that lead back to n. A classic example of a DAG is a path to get from some node, a, to another node, b, which can visit other nodes on the way from a to b. For instance, the measure formula in the above Projected Revenue example provides the directionality of computation, which is that the Projected Sales Price per Unit at the node Product1 needs to be evaluated before the Projected Revenue can be evaluated. This provides an order of how to compute the graph. More broadly, the methods, systems, and devices disclosed herein develop a logical DAG data structure using the above building blocks.

A subset of the nodes can be marked as "cube-eligible". This subset of nodes will be organized into tuples depending on the relationship between them in the graph. These sets of tuples will become the coordinates of cells that will feed data to the multidimensional cube. Not all graph nodes need to be mapped to the multidimensional cube. By retaining the right level of detail in the graph model, and promoting a subset of them to the cube for multidimensional analysis, the methods, systems, and devices disclosed herein provide for capturing native modeling complexity compactly in a graph structure, while allowing for multidimensional analysis for users, and doing so with large data sets.

The graph-cube mapping is bidirectional. In other words, values calculated in the graph can be pushed into the cube for analysis. Similarly, values calculated in the cube can be pushed into the graph for modeling.

Similar to the nodes, a subset of measures can also be marked as "cube-eligible". This would identify them to be automatically imported into the cube or multidimensional model.

2. Traversing the Graph

As the system traverses the graph to evaluate the results, it performs the following tasks:

1. Compile nodes, edges, and measure formulae into an executable program for traversing the graph. This is done such that all the nodes upstream of a given node, i.e., the ancestors of a given node, are evaluated prior to the given node, and all nodes downstream of a given node, i.e., the descendants of a given node, are evaluated after the given node. Upstream and downstream nodes are defined based on (1) the relationships between the nodes, which provide the framework of the graph, and (2) the measure formulae that are used to express the dependencies along the edges and the corresponding directionality of the relationship. In general, this ordering of nodes is described as comprising the graph's topological ordering, an ordering such that the starting node of every edge occurs earlier in the ordering than the ending point of the edge. For instance, if Projected Revenue for a path is a function of Sales Price per Unit at the product node, then the product node needs to be evaluated prior to evaluating the particular path. It is possible to visit the same node or path multiple times within the evaluation sequence in order to compute different measures. However, cyclical computations are avoided by the system by flagging them during the topological sort.

2. For each node in the above order, the following tasks are performed:
   a. Evaluate measures that depend on measures from the ancestors, where ancestors are nodes that precede the current node in the graph's topological ordering.
   b. Evaluate the measures at the node.
   c. Prepare the measures that are needed for the descendants.
   d. Perform all of these calculations as a time series so the measures are stored as a vector (along time).
   e. If the node is a cube-eligible node, perform additional steps of preparing a tuple by linking it to the set of cube-eligible nodes upstream of it. Then all cube-eligible measure data along the tuple is computed and stored against the tuple. This is, in effect, an instantiation of the pegging logic described in the previous section. This pegging computation enables the graph to prepare the data for the cell level intersection in the cube.

3. Prepare the output set of tuples, which are combinations of cube-eligible nodes, and the corresponding cube-measures as time vector. This output becomes a logical table that feeds the cube. See Table 1 of an example of a logical table that the above traversal would generate.

Note that not all nodes need to be marked as cube-eligible, and are not likely to be as well. According to the methods, systems, and devices disclosed herein those nodes are accounted for computation purposes, but they are not surfaced to the cube.

As used herein, a measure formula, e.g., a graph measure formula, is a broad term that has its ordinary meaning to persons of skill in the art and includes a calculation expression similar to those available in a spreadsheet program, such as Microsoft Excel. For example, a measure formula might calculate revenue as units times average selling price. In this case, measure revenue is derived from measures units and average selling price. A hypercube measure formula is similar to a graph measure formula, except that a primary difference is how dependencies are tracked for hypercube measure formula. For a graph measure formula, dependencies can be modeled using paths between nodes, whereas dependencies can be modeled as dimension hierarchy relationships for a hypercube measure formula.

The dependency between graph and cube measures is governed by whether the operation is a roll-up—for example, calculating total spend—or an allocation (or roll-down)—for example, allocating overhead expenses to finished goods to analyze product profitability. In the roll-up ease, graph measures must be evaluated before the dependent cube measures. In the allocation (or roll-down) case, the cube measures must be evaluated before the dependent graph measures.

3. Building the Multidimensional Model

Similar to expressing the building blocks of the graph, methods, systems, and devices disclosed herein allow for expressing the list of dimensions (also known as axes) and the hierarchies associated with these dimensions. These from the building blocks for the multidimensional model, also called a "cube" or more accurately a "hypercube." For example, the sales planning cube could be expressed with product, customer, sales-organization, and time as the four dimensions. In certain embodiments, the methods, systems, and devices disclosed herein provide for measures that are expressed at the intersections of these dimensions. The measures in the cube can either be inputs by a user, loaded from an external data source, derived based on measure formula, or derived based on data in the graph database.

The linkage between the graph and the cube is done by mapping specific members of each of the cube's dimensions to the corresponding cube-eligible nodes in the graph. The simplest mapping is a one-to-one mapping where the node is identical to the corresponding member of the dimension. However, it is possible to have more complex mappings as well, such as a many-to-one relationship between the graph nodes and the cube member, and a corresponding aggregation or other processing of the measure data to compute the target cube value from the graph.

The Fact Table mentioned in the previous section becomes the set of values that are loaded into the cube cells from the graph. Once loaded, the cube can perform aggregation, allocations, or other mathematical operations on the measures to process the values at other levels of the dimension hierarchies. The logic for computation would be independently expressed by the user. In addition, the cube can independently load and compute additional measures outside of the graph based results in order to prepare results. Finally, measures computed in the cube can be pushed back into the graph using the selfsame Fact Table.

In some implementations, the methods, systems, and devices disclosed herein provide for linking the fact table to an external multidimensional model. In such an example, the cube management work is performed by an external system, and the fact table output according the disclosed methods, systems, and devices becomes one data source for use in the external system.

4. Base Plans

In certain embodiments, multiple base plans can be employed in the methods, systems, and devices disclosed herein. A base plan is a container for the entire graph plus cube structure. An example of the base plan would be the Actuals, which holds the actuals data, as opposed to a Forecast base plan, which holds the latest Forecast data.

5. Managing User Scenarios

According to another aspect, the methods, systems, and devices disclosed herein allow users to create user-defined "scenarios," e.g., to perform what-if analysis on them. Each user can create one or more scenarios. Each scenario can be thought of as a list of user changes that are stored sequentially in the order of entry. Scenarios can be branched from base plans or from other scenarios, or they can be constructed from scratch.

Scenarios are owned. Scenarios can be private to a user or users can choose to share them with other users as a way to collaborate on a solution to a particular planning problem. The users can be inside the company or they can be the company's suppliers or customers.

In the context of a specific scenario, as the user navigates within the system and asks for a measure value at either a cube cell or at a graph node, the following steps are performed:

1. The base value for the measure is retrieved either from the graph database or from the cube, as specified by the query.
2. The system applies the sequential list of changes in dependency order after filtering them based on the subset of changes that are upstream of the current location.
3. The incremental value at the current location is computed based on the application of those changes.
4. The final value, a combination of the base value and the incremental value, is returned to the user by the system.

In one implementation, the change application process happens on-demand. In other words, the system recalculates affected values at user query time. In another implementation, the change application process happens in the background, in advance of the user query. The latter can reduce query response times when the number of dependent changes is large.

Due to the dependency map generated by the system, the above change list based scenario analysis becomes a ready implementation on top of the base plan.

6. Time Dimension

In certain embodiments, the methods, systems, and devices disclosed herein employ a common time dimension that spans across plans, graphs, and cubes. This provides a consistent definition of time in the system.

7. Dependency Analysis Across Graph and Cube

As mentioned in a previous section, the methods, systems, and devices disclosed herein develop an evaluation order for all objects in the graph, such as nodes, edges, and paths. In certain embodiments, this evaluation order can be extended based on the dependency analysis to the cells in the cube as well.

This extension of the dependency analysis across the objects of the graph and the cube leads to seamless propagation of changes that are entered by the user in the context of a scenario. In other words, when a user queries a particular location in the model—whether in the graph or in the cube—the system uses the dependency analysis to identify a list of objects upstream of the current location, assembles the subset of user changes within the scenario associated with those objects, and evaluates them in order to determine the incremental value at the current location.

8. Scalability and Implementation Considerations

The potential scalability considerations are discussed here by taking an example. The example is that of a two-dimensional model with the dimensions being Product and Customer and having the following additional parameters:

The Product dimension has two levels—SKU (Stock Keeping Unit) and Product-Family
There are 1000 members at the SKU level that roll-up to 10 Product-Family level members.
There are 100 members in the Customer dimension.
On average, one customer orders 10 SKUs.

Option 1: model the above relationship in an OLAP cube. In a simple OLAP model, the potential number of combinations would be the cross-product of the number of members of the two dimensions:

$$(1000 \text{ SKUs} + 10 \text{ Product Families}) \times 100 \text{ customers} = 1 \times 10^5 \text{ combinations}$$

Figure 4:
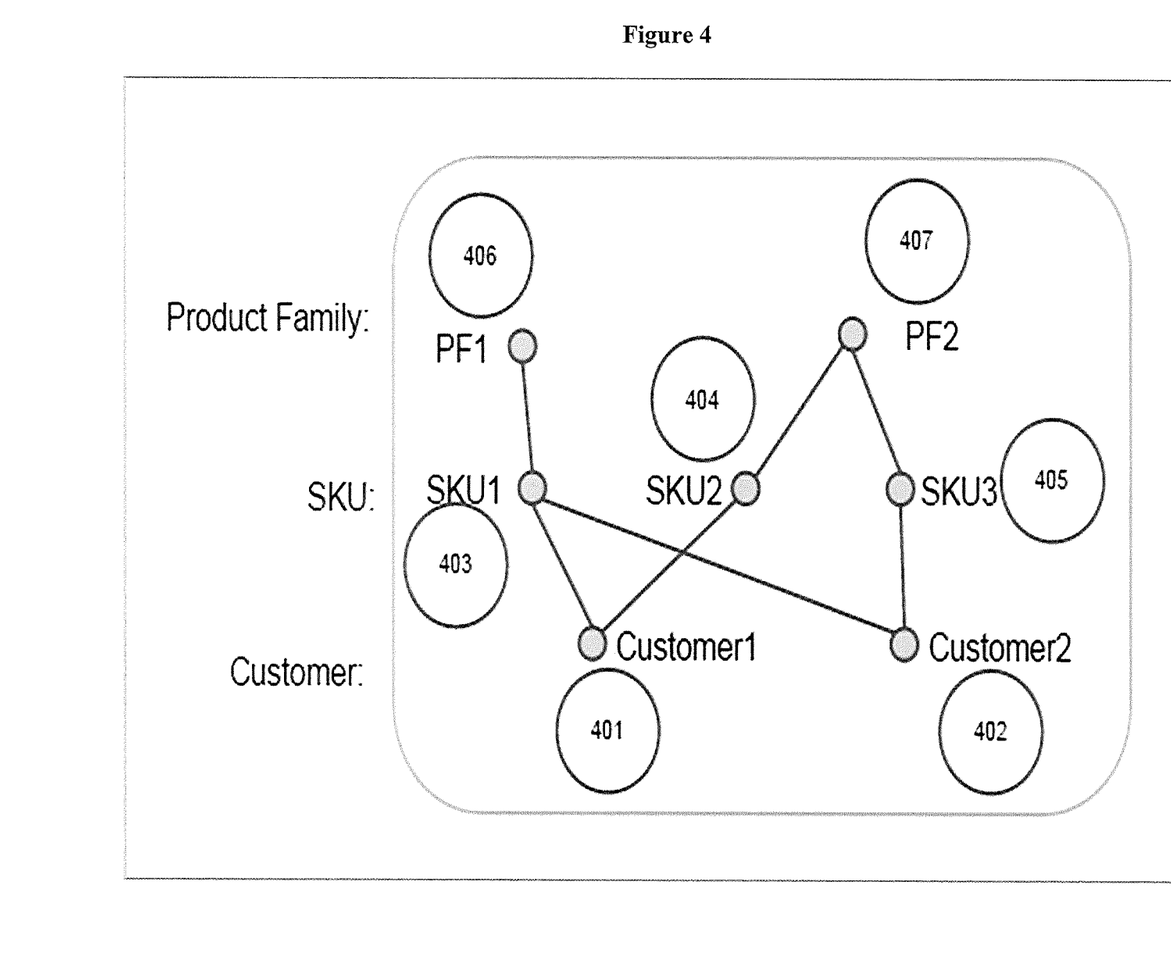
FIG. 4 illustrates an example of a graph diagram for a Product and Customer based model, according to some implementations.

Option 2: model the above relationship according to the methods, systems, and devices disclosed herein. While there are multiple ways to model the above scenario according to the methods, systems, and devices disclosed herein, one way would be to generate a graph that links SKU members to customers, and also SKU members to the product families. The cube, in this case, will have the Product-Family and Customer dimensions. The graph aspect of this model is shown in FIG. 4. Customer1 401 is linked to SKU1 403. SKU1 403 is also linked to PF1 406. Only the nodes for Customer1 401 and Customer2 402 and Product Family 1 406 and Product Family 2 407 are marked cube-eligible.

With that, the number of combinations in the graph:

$$(100 \text{ customers} \times 10 \text{ SKUs per customer}) + 1000 \text{ SKU.ProductFamily combinations} = 2 \times 10^3 \text{ combinations}$$

In the cube: the number of combinations would be:

$$10 \text{ Product Families} \times 100 \text{ customers} = 1 \times 10^3 \text{ combinations}$$

And the total number of combinations would be:

$$2 \times 10^3 \text{ combinations} + 1 \times 10^3 \text{ combinations} = 3 \times 10^3 \text{ combinations}$$

That makes the foregoing model embodying certain methods, systems, and devices disclosed herein 33.3 times more compact than the corresponding cube only implementation. A significant advantage of this is that the memory required to represent and compute the entire calculation domain is greatly reduced, which leads to more optimal usage of scarce resources and improved runtime performance.

The goal of the above illustration is to show how the number of modeling options increases with the combination of graph and cube, and how that can significantly impact the size of the model.

Examples of Possible Use Eases

The methods, systems, and devices disclosed herein enable numerous new applications, as well as improving implementations of existing applications in scalability, responsiveness, and flexibility. The following are several exemplary applications of the methods, systems, and devices disclosed herein, in each case the disclosed methods, systems, and devices result in significant improvement in computational efficiency and reduction in computation resource requirements.

1. Sales Territory Planning.

This example was used throughout this document. Managers use sales territory plans to optimize the deployment of their salesforce. For this, they build models that capture their salesforce, the products they sell, and their current and prospective customers. The problem is complex even at smaller companies. Consider, for instance, the number of possible combinations for analysis at a company whose sales team of 100 sells its 500 products to 1000 customers.

While pure OLAP solutions would work well to aggregate a detailed plan so that managers can evaluate key figures, such as total revenues, they will struggle if the manager wished to analyze the effect of deploying her salesforce by region instead of by industry or customer segment. This is just where the presently disclosed graph plus cube based solutions shine because they are better than cube-based OLAP at handling structural changes. The graph naturally models changes in relationships between nodes, so building alternate aggregation paths is simple and efficient.

2. Workforce Planning.

In workforce planning, managers develop operating plans for their departments, which are in turn aggregated to corporate legal entities. Employees are often the main drivers of costs, so workforce planning models typically consist of Employee and Department dimensions.

A typical OLAP solution would struggle here because the resulting cube would be very sparse, because, while there are lots of employees and departments (which have a large potential cross product) a given employee usually works in one department (which is a tiny actual data set). According to the methods, systems, and devices disclosed herein, this would be a non-issue because a graph is an inherently dense data structure—it instantiates only valid relationships (that is, employee nodes would have edges only to their parent departments.)

3. Product Cost Planning.

Here we consider BOMs. A BOM can be thought of as a recipe—it is a characterization of the parts that go into making a particular finished good. For example, the BOM for a bike would show that a bike has two wheels, one frame, one seat, two pedals, and so on. Further, it would show that a wheel has 20 spokes, an inner tube, and a tire. It should be clear BOMs are naturally modeled as graphs, where nodes represent parts and edges represent relationships between those parts.

To calculate product cost, simply traverse the BOM represented by the graph starting from components and ending at finished goods. One set of measures in the nodes would contain the part unit cost and another set of node measures would contain the rolled up costs, that is, the total cost of all descendent parts. At the finished good level, the rolled up cost would be the total cost of the product.

Dimension hierarchies of OLAP cubes are not well suited for modeling BOMs because, unlike a graph, they don't contain information in edges. Moreover, BOMs change over time, to reflect the evolution of the product, so even if dimension hierarchies were enhanced to store information in edges, the static nature of OLAP cubes would make modeling dynamic BOMs cumbersome.

4. Other Product-Related Models.

Building models for planning other product-related metrics, such as quality and lead-times, follows from the prior example.

While the invention has been described in detail with respect to certain embodiments, the invention is not limited to those embodiments. It should be understood that modifications and combinations may be made to the illustrated embodiments and other disclosed features to form yet additional embodiments within the scope of the invention.

We claim:

1. A method, comprising:
   providing, using a processor, a hypercube linked to a graph;
   obtaining hierarchical data, comprising:
      compiling nodes, edges, and measure formulae into an executable program for traversing the graph, comprising:
         marking a subset of nodes;
         determining whether a given node is a marked node of the subset of nodes; and
         in response to a determination that the given node is a marked node of the subset of nodes:
            preparing a tuple by linking the given node to a node of the subset of nodes upstream of the given node;
            computing measure data along the tuple; and
            storing the measure data against the tuple;
   providing a logical fact table mapping data between the graph and the linked hypercube using the tuple;
   combining the hierarchical data and the logical fact table to obtain an instantiation of the hypercube;
   providing a dependency analysis across the graph and hypercube measures; and
   preparing a plan that provides a set of all graph and hypercube data at a certain point in time based on a scenario that contains user changes.

2. The method of claim 1, wherein a link between the graph and the hypercube involves mapping specific members of each of the dimensions of the hypercube to corresponding nodes of the subset of nodes in the graph.

3. The method of claim 2, wherein the mapping provides a many-to-one relationship between nodes of the subset of nodes in the graph and a corresponding member of the hypercube.

4. The method of claim 1, wherein the providing of the dependency analysis across the graph and the hypercube comprises propagating changes that are entered by a user in a context of a scenario.

5. The method of claim 1, wherein the method further comprises:
   retrieving a base value for a measure either from the graph or from the hypercube, as specified by a user query;
   applying a sequential list of changes in dependency order after filtering them based on a subset of changes that are upstream of a current node;
   computing an incremental value at the current node based on an application of the subset of changes; and
   displaying a final value to the user.

6. A computer program product being embodied in a tangible non-transitory computer readable storage medium and comprising computer instructions for:
- providing, using a processor, a hypercube linked to a graph;
- obtaining hierarchical data, comprising:
  - compiling nodes, edges, and measure formulae into an executable program for traversing the graph, comprising:
    - marking a subset of nodes;
    - determining whether a given node is a marked node of the subset of nodes; and
    - in response to a determination that the given node is a marked node of the subset of nodes:
      - preparing a tuple by linking the given node to a node of the subset of nodes upstream of the given node;
      - computing measure data along the tuple; and
      - storing the measure data against the tuple;
- providing a logical fact table mapping data between the graph and the linked hypercube using the tuple;
- combining the hierarchical data and the logical fact table to obtain an instantiation of the hypercube;
- providing a dependency analysis across the graph and hypercube measures; and
- preparing a plan that provides a set of all graph and hypercube data at a certain point in time based on a scenario that contains user changes.

7. The computer program product of claim 6, wherein a link between the graph and the hypercube involves mapping specific members of each of the dimensions of the hypercube to corresponding nodes of the subset of nodes in the graph.

8. The computer program product of claim 7, wherein the mapping provides a many-to-one relationship between nodes of the subset of nodes in the graph and a corresponding member of the hypercube.

9. The computer program product of claim 6, wherein the providing of the dependency analysis across the graph and the hypercube comprises propagating changes that are entered by a user in a context of a scenario.

10. The computer program product of claim 6, further comprising computer instructions for:
- retrieving a base value for a measure either from the graph or from the hypercube, as specified by a user query;
- applying a sequential list of changes in dependency order after filtering them based on a subset of changes that are upstream of a current node;
- computing an incremental value at the current node based on an application of the subset of changes; and
- displaying a final value to the user.

* * * * *

UNITED STATES PATENT AND TRADEMARK OFFICE
CERTIFICATE OF CORRECTION

PATENT NO. : 11,429,668 B2
APPLICATION NO. : 17/122846
DATED : August 30, 2022
INVENTOR(S) : Matthew Shore et al.

It is certified that error appears in the above-identified patent and that said Letters Patent is hereby corrected as shown below:

On the Title Page

In page 2, Column 2, item (56), other publications, cite no. 1, after "Ghrab et al.", insert --,--.

In page 2, Column 2, item (56), other publications, cite no. 2, after "Chen et al.", insert --,--.

In page 2, Column 2, item (56), other publications, cite no. 3, after "Jakawat et al.", insert --,--.

In page 2, Column 2, item (56), other publications, cite no. 4, after "Lakshmanan et al.", insert --,--.

In the Specification

In Column 1, Line(s) 38, after "instance,", delete "it" and insert --if--, therefor.

In Column 1, Line(s) 65, after "technology", delete "," and insert --.--, therefor.

In Column 4, Line(s) 20, after "model", delete ".".

In Column 5, Line(s) 26, after "known", delete "a" and insert --as--, therefor.

In Column 9, Line(s) 13, after "according", insert --to--.

Signed and Sealed this
Thirty-first Day of January, 2023

Katherine Kelly Vidal
*Director of the United States Patent and Trademark Office*